(12) United States Patent
Budampati et al.

(10) Patent No.: US 7,933,240 B2
(45) Date of Patent: Apr. 26, 2011

(54) APPARATUS AND METHOD FOR REDUNDANT CONNECTIVITY AND MULTI-CHANNEL OPERATION OF WIRELESS DEVICES

(75) Inventors: Ramakrishna S. Budampati, Maple Grove, MN (US); Patrick S. Gonia, Maplewood, MN (US); Arun V. Mahasenan, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 845 days.

(21) Appl. No.: 11/880,116

(22) Filed: Jul. 19, 2007

(65) Prior Publication Data
US 2009/0022121 A1 Jan. 22, 2009

(51) Int. Cl.
*H04B 7/216* (2006.01)
(52) U.S. Cl. ............... 370/328; 370/338; 370/395.3; 455/550.1
(58) Field of Classification Search .......... 370/338, 370/395.3, 328; 455/550.1
See application file for complete search history.

(56) References Cited

U.S. PATENT DOCUMENTS

| | | | |
|---|---|---|---|
| 5,537,414 A | 7/1996 | Takiyasu et al. | |
| 6,381,215 B1 * | 4/2002 | Hamilton et al. | 370/236 |
| 2003/0109270 A1 * | 6/2003 | Shorty | 455/517 |
| 2005/0013294 A1 * | 1/2005 | Cypher | 370/389 |
| 2005/0111416 A1 * | 5/2005 | Ginzburg | 370/338 |
| 2005/0117515 A1 * | 6/2005 | Miyake | 370/231 |
| 2005/0125502 A1 * | 6/2005 | Fambon et al. | 709/213 |
| 2005/0201349 A1 | 9/2005 | Budampati | |
| 2005/0281215 A1 | 12/2005 | Budampati et al. | |
| 2006/0002368 A1 | 1/2006 | Budampati et al. | |
| 2006/0171344 A1 | 8/2006 | Subramanian et al. | |
| 2006/0171346 A1 | 8/2006 | Kolavennu et al. | |
| 2006/0227729 A1 | 10/2006 | Budampati et al. | |
| 2006/0256740 A1 | 11/2006 | Koski | |
| 2006/0274644 A1 | 12/2006 | Budampati et al. | |
| 2006/0274671 A1 | 12/2006 | Budampati et al. | |
| 2006/0287001 A1 | 12/2006 | Budampati et al. | |
| 2007/0030816 A1 | 2/2007 | Kolavennu | |
| 2007/0030832 A1 | 2/2007 | Gonia et al. | |
| 2007/0076638 A1 | 4/2007 | Kore et al. | |
| 2007/0077941 A1 | 4/2007 | Gonia et al. | |
| 2007/0087763 A1 | 4/2007 | Budampati et al. | |
| 2007/0091824 A1 | 4/2007 | Budampati et al. | |

(Continued)

OTHER PUBLICATIONS

Dr. Soumitri Kolavennu, Presentation, "WNSIA MAC Layer", ISA SP100 meeting, Feb. 14, 2007, 24 pages, see esp. p. 17.
Office Action dated Jul. 8, 2009 in connection with U.S. Appl. No. 11/799,171.

(Continued)

*Primary Examiner* — Danh C Le
(74) *Attorney, Agent, or Firm* — Munck Carter, LLP

(57) ABSTRACT

A wireless network includes leaf nodes (such as wireless sensors or other wireless devices) and infrastructure nodes (such as access points). The leaf nodes communicate data messages to the infrastructure nodes. The infrastructure nodes communicate the data messages to gateway infrastructure nodes, which transmit the data messages over a wired network. The leaf nodes may communicate data messages to multiple infrastructure nodes in various ways. For example, the leaf nodes may transmit multiple messages, one at a time, to multiple infrastructure nodes. The leaf nodes may also broadcast a single message to multiple infrastructure nodes. In addition, the leaf nodes may communicate a single message containing a group identifier (such as a multi-cast group address) associated with multiple infrastructure nodes. In this way, communications from the leaf nodes may be more reliable. This may be particularly useful, for example, in networks such as 802.11-based networks.

20 Claims, 5 Drawing Sheets

U.S. PATENT DOCUMENTS

2007/0091825 A1     4/2007    Budampati et al.
2007/0155423 A1     7/2007    Carmody et al.
2008/0075000 A1     3/2008    Robbins

OTHER PUBLICATIONS

Office Action dated Feb. 5, 2010 in connection with U.S. Appl. No. 11/799,171.

Thomas L. Phinney, "Apparatus and Method for Acknowledging Successful Transmissions in a Wireless Communication System," U.S. Appl. No. 11/799,171, filed May 1, 2007.

Dongyan Chen et al., "Dependability Enhancement for IEEE 802.11 Wireless LAN with Redundancy Techniques," Proceedings of the 2003 International Conference on Dependable Systems and Networks, 2003, 8 pages.

\* cited by examiner

US 7,933,240 B2

APPARATUS AND METHOD FOR REDUNDANT CONNECTIVITY AND MULTI-CHANNEL OPERATION OF WIRELESS DEVICES

TECHNICAL FIELD

This disclosure relates generally to wireless communication systems and more specifically to an apparatus and method for redundant connectivity and multi-channel operation of wireless devices.

BACKGROUND

Processing facilities are often managed using industrial control and automation systems. Example processing facilities include chemical, pharmaceutical, paper, and petrochemical production plants. Among other operations, industrial control and automation systems typically interact with and control industrial equipment in the processing facilities, such as equipment used to produce chemical, pharmaceutical, paper, or petrochemical products.

Industrial control and automation systems routinely include wired components and wireless components, such as wireless sensor networks that provide data to wired controllers. A typical wireless sensor network (such as one that operates according to an IEEE 802.11 standard) includes battery-powered sensor devices and line-powered access points. The access points typically provide access to a wired network, such as an Ethernet network.

Since each sensor device in a typical wireless sensor network communicates with a single access point, this increases the likelihood of unreliable communications in the wireless network. This reduces the overall reliability of the 802.11-based wireless network, particularly for applications involving critical or low latency data. Moreover, the transmission power of the sensor devices typically cannot be increased to provide greater reliability since the sensor devices are typically battery-powered (and any increase in transmission power results in a corresponding increases in power consumption).

SUMMARY

This disclosure provides an apparatus and method for redundant connectivity and multi-channel operation of wireless devices.

In a first embodiment, a method includes transmitting at least one message from a wireless device in a wireless network to a plurality of access points in the wireless network. The method also includes receiving at least one acknowledgement message at the wireless device from at least one of the access points.

In particular embodiments, the wireless network represents a network compliant with an IEEE 802.11 standard.

In other particular embodiments, the wireless device communicates a plurality of messages to the access points, where one message is sent from the wireless device to each of the access points. The wireless device could communicate each of the messages to one of the access points using a different Service Set Identifier (SSID).

In still other particular embodiments, the wireless device communicates a single message to the access points, where the message is broadcast from the wireless device to all access points within range of the wireless device. Also, Medium Access Control (MAC) layer address filtering may not used in the access points to process the message. In addition, the message may be received by at least one of the access points and may be provided to a mesh layer in at least one of the access points for filtering based on a source address of the message.

In yet other particular embodiments, the wireless device communicates a single message to the access points, where the message includes a group identifier that identifies intended access points associated with the message. The access points could operate in a Point Coordination Function (PCF) mode of operation.

In a second embodiment, an apparatus includes a memory configured to store data to be transmitted. The apparatus also includes a controller configured to generate a message containing at least some of the data to be transmitted. The apparatus further includes a wireless transceiver configured to transmit the message to a plurality of access points in a wireless network. In addition, the apparatus includes a local power supply configured to supply power to the memory, the controller, and the wireless transceiver. The wireless transceiver is further configured to receive at least one acknowledgement message from at least one of the access points.

In a third embodiment, an apparatus includes a wireless transceiver configured to receive a message from a wireless device. The apparatus also includes a controller configured to identify a group identifier associated with the message. In addition, the apparatus includes a memory configured to store information identifying one or more intended recipients and an order of acknowledgement transmission associated with the group identifier. The controller is further configured to determine whether the apparatus is one of the intended recipients associated with the group identifier and, if so, to identify a time or position to transmit an acknowledgement message to the wireless device. The wireless transceiver is further configured to transmit the acknowledgement message to the wireless device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
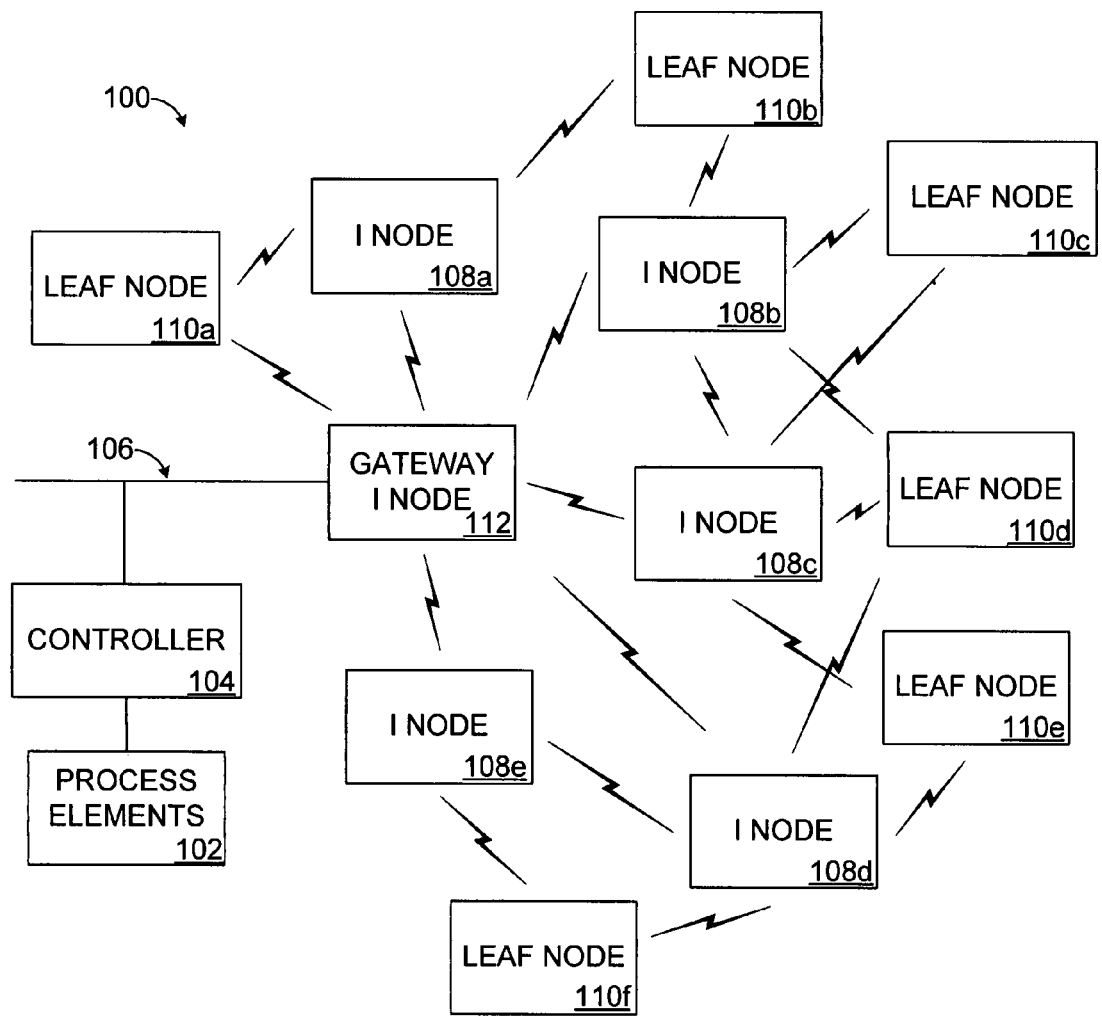
FIG. 1 illustrates an example industrial control and automation system according to one embodiment of this disclosure.

FIG. 1 illustrates an example industrial control and automation system 100 according to one embodiment of this disclosure. The embodiment of the industrial control and automation system 100 shown in FIG. 1 is for illustration only. Other embodiments of the industrial control and automation system 100 may be used without departing from the scope of this disclosure.

In this example embodiment, the industrial control and automation system 100 includes one or more process elements 102. The process elements 102 represent components in a process or production system that may perform any of a wide variety of functions. For example, the process elements 102 could represent valves, pumps, or any other or additional industrial equipment in a processing environment. Each of the process elements 102 includes any suitable structure for performing one or more functions in a processing or production system.

A controller 104 is coupled to the process elements 102. The controller 104 controls the operation of one or more of the process elements 102. For example, the controller 104 could provide control signals to one or more of the process elements 102, thereby adjusting the operation of those process elements 102. The controller 104 could also receive information associated with the system 100, such as by receiving sensor measurements of a flow rate of material through a pipe. The controller 104 could use this data to control one or more of the process elements 102, such as by controlling a valve using the measured flow rate. The controller 104 includes any hardware, software, firmware, or combination thereof for controlling one or more process elements 102. The controller 104 could, for example, represent a computing device executing a MICROSOFT WINDOWS operating system.

A network 106 couples the controller 104 to other components in the industrial control and automation system 100. The network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks (LANs), metropolitan area networks (MANs), wide area networks (WANs), all or a portion of a global network such as the Internet, or any other communication system or systems at one or more locations.

As shown in FIG. 1, the industrial control and automation system 100 also includes one or more wireless networks for communicating with wireless sensors or other wireless devices. In this example, a wireless network is formed using infrastructure nodes ("I nodes") 108a-108e, leaf nodes 110a-110f, and a gateway infrastructure node 112.

The infrastructure nodes 108a-108e and the leaf nodes 110a-110f engage in wireless communications with each other. For example, the infrastructure nodes 108a-108e may receive data transmitted over the network 106 (via the gateway infrastructure node 112) and wirelessly communicate the data to the leaf nodes 110a-110f. Similarly, the leaf nodes 110a-110f may wirelessly communicate data to the infrastructure nodes 108a-108e for forwarding to the network 106 (via the gateway infrastructure node 112). In addition, the infrastructure nodes 108a-108e may wirelessly exchange data with one another. In this way, the nodes 108a-108e and 110a-110f form a wireless network capable of providing wireless coverage to a specified area, such as in a large industrial complex.

In this example, the nodes 108a-108e and 110a-110f are divided into infrastructure nodes and leaf nodes. The infrastructure nodes 108a-108e typically represent line-powered devices, meaning these nodes receive operating power from an external source. As a result, these nodes 108a-108e are typically not limited in their operations since they need not minimize power consumption to increase the operational life of their internal power supplies. On the other hand, the leaf nodes 110a-110f typically represent battery-powered devices, meaning these nodes receive operating power from internal batteries or other power supplies. Because of this, these nodes 110a-110f are often more limited in their operations in order to help preserve the operational life of their internal power supplies.

Each of the nodes 108a-108e and 110a-110f includes any suitable structure facilitating wireless communications. Each of the nodes 108a-108e and 110a-110f could also include other functionality, such as functionality for generating or using data communicated over the wireless network. For example, the leaf nodes 110a-110f could represent wireless sensors in an industrial facility, where the leaf nodes are used to measure various characteristics within the facility. These sensors could collect sensor readings and communicate the sensor readings to the controller 104 via the gateway infrastructure node 112. The leaf nodes 110a-110f could also represent actuators that can receive control signals from the controller 104 and adjust the operation of the industrial facility. In this way, the leaf nodes 110a-110f may include or operate in a similar manner as the process elements 102 that are physically connected to the controller 104.

The gateway infrastructure node 112 communicates wirelessly with, transmits data to, and receives data from one or more infrastructure nodes 108a-108e and possibly one or more leaf nodes 110a-110f. The gateway infrastructure node 112 also converts data between the protocol(s) used by the network 106 and the protocol(s) used by the nodes 108a-108e and 110a-110f. For example, the gateway infrastructure node 112 could convert Ethernet-formatted data (transported over the network 106) into a wireless protocol format (such as the IEEE 802.11a, 802.11b, 802.11g, or 802.11n protocol format) used by the nodes 108a-108e and 110a-110f. The gateway infrastructure node 112 could also convert data received from one or more of the nodes 108a-108e and 110a-110f into Ethernet-formatted data for transmission over the network 106. In addition, the gateway infrastructure node 112 supports various functions, such as network creation and security, used to create and maintain a wireless network. The gateway infrastructure node 112 includes any suitable structure for facilitating communication between components or networks using different protocols.

In one aspect of operation, the infrastructure nodes 108a-108e are typically deployed over a specified area where the leaf nodes 110a-110f are operating. In this example, one or more of the leaf nodes 110a-110f are configured to transmit data to multiple infrastructure nodes 108a-108e and 112. Each of the infrastructure nodes 108a-108e and 112 that receives a transmission from a leaf node 110a-110f can respond by transmitting an acknowledgement message (such as a Medium Access Control or "MAC" acknowledgement) to the leaf node. Each of the infrastructure nodes 108a-108e that receives a transmission from a leaf node can also forward the transmission to the gateway infrastructure node 112.

In an 802.11-based network, the infrastructure nodes 108a-108e may represent access points, and the leaf nodes 110a-110f may represent mobile or other stations. Collectively, an access point and a station form a Basic Service Set (BSS), and multiple Basic Service Sets are connected by a Distribution Set (DS) network to a gateway.

A leaf node 110a-110f can transmit data to multiple infrastructure nodes 108a-108e and 112 in various ways. In some embodiments, the leaf node communicates multiple messages to multiple infrastructure nodes 108a-108e and 112. For example, the leaf node may individually communicate a single message to each of two or more infrastructure nodes, where each message is addressed or directed to one of the infrastructure nodes. The leaf node could transmit the messages one at a time until messages for all intended infrastructure nodes have been transmitted. The leaf node could also transmit the messages one at a time and stop when an acknowledgement has been received from at least one of the infrastructure nodes (even if messages for all intended infrastructure nodes have not been transmitted).

In particular embodiments using this technique, all of the nodes 108*a*-108*e*, 110*a*-110*f*, 112 in the industrial control and automation system 100 may operate using the same Service Set Identifier (SSID). In other particular embodiments using this technique, the leaf node could use different SSIDs to unicast data to different infrastructure nodes.

In other embodiments, the leaf node communicates a single message to multiple ones of the infrastructure nodes 108*a*-108*e* and 112. For example, the message can be broadcast from the leaf node to all receiving nodes within range of the leaf node.

In particular embodiments using this technique, MAC-layer address filtering could be disabled in the infrastructure nodes, and all packets received by the infrastructure nodes could be forwarded to a mesh layer below a network layer in the infrastructure nodes. The mesh layer in an infrastructure node could filter out packets based on the source address of the packets, such as by determining whether that infrastructure node has been assigned to handle data traffic from a particular leaf node. The infrastructure nodes 108*a*-108*e* and 112 can also determine an order in which acknowledgement messages are sent to the leaf node, and the infrastructure nodes can respond to the leaf node by sending acknowledgement messages in that order.

In still other embodiments, the leaf node communicates a single message to multiple ones of the infrastructure nodes 108*a*-108*e* and 112. The message includes a group identifier (such as a group number or group address) that identifies multiple infrastructure nodes that are intended to receive, process, and forward the message. The group identifier can also identify an order in which the intended infrastructure nodes send the acknowledgement messages to the leaf node. In particular embodiments, the group identifier represents or is associated with a multi-cast group address. The multi-cast group assignments (the assignments of infrastructure nodes to multi-cast groups) can be done in any suitable manner, such as by a centralized application in the industrial control and automation system 100.

In particular embodiments using this technique, the nodes 108*a*-108*e*, 110*a*-110*f*, 112 may operate in a Point Coordination Function (PCF) mode of operation. Here, the infrastructure nodes 108*a*-108*e* may communicate amongst themselves using a Distribution Set network (such as an Ethernet, 802.11, or other wired or wireless network) and form groups of n-tuples based on the common leaf nodes 110*a*-110*f* they have to serve. In this way, a group of n infrastructure nodes can achieve n-level redundancy to the leaf node being served. The leaf node can use a group address to multicast its data, and all infrastructure nodes that are registered with the group address ideally receive this data and forward it to the gateway.

By communicating a data message from a leaf node 110*a*-110*f* to multiple infrastructure nodes 108*a*-108*e* and 112, the spatial diversity of the infrastructure nodes 108*a*-108*e* and 112 may help to reduce or eliminate lost transmissions in the industrial control and automation system 100. For example, it may help to reduce "shadowing" or other problems encountered with wireless transmission systems. Moreover, the end-to-end packet latency in the system 100 may not be affected due to packet loss using various ones of these techniques, and the number of retransmissions by the leaf nodes can be reduced. In addition, the power consumption of the leaf nodes 110*a*-110*f* may be reduced, which could result from reducing the number of retransmissions by the leaf nodes. Using these techniques, certain network technologies, such as IEEE 802.11-based networks, may be more reliable and therefore more desirable for use in wireless sensor networks in industrial control and automation systems. This type of functionality could also be used in any other suitable 802.11-based wireless communication system that requires improved reliability, lower latency, and other benefits described above.

Although FIG. 1 illustrates one example of an industrial control and automation system 100, various changes may be made to FIG. 1. For example, the industrial control and automation system 100 could include any number of process elements, controllers, networks, infrastructure nodes (gateway or other), and leaf nodes. Also, the functional division shown in FIG. 1 is for illustration only. Various components in FIG. 1 could be combined or omitted and additional components could be added according to particular needs. Further, while described as supporting one wireless network, the industrial control and automation system 100 could support any number of wireless networks. Beyond that, the communication paths and layout in FIG. 1 are for illustration only and can be changed depending on the implementation. As a particular example, the leaf nodes 110*a*-110*f* in FIG. 1 could communicate with each other and with any arrangement of infrastructure nodes 108*a*-108*e* and 112. In addition, FIG. 1 illustrates one operational environment in which leaf nodes may communicate with multiple infrastructure nodes in a wireless network. This functionality could be used in any suitable industrial control and automation system or environment or in any non-industrial control and automation system or environment (such as any system using an 802.11-based wireless network).

Figure 2:
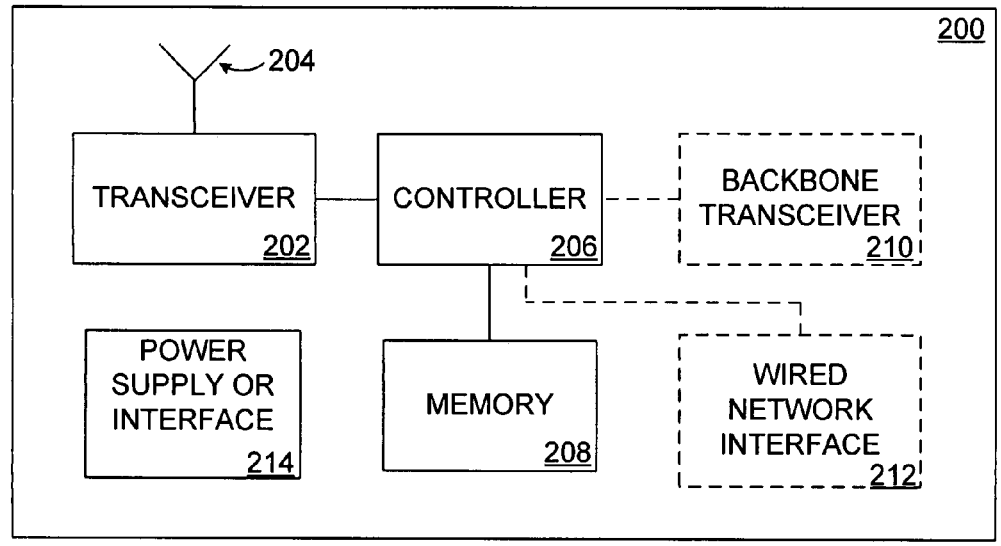
FIG. 2 illustrates an example node in an industrial control and automation system according to one embodiment of this disclosure.

FIG. 2 illustrates an example node 200 in an industrial control and automation system according to one embodiment of this disclosure. The node 200 could, for example, represent an infrastructure node, a gateway infrastructure node, or a leaf node from the industrial control and automation system 100 of FIG. 1. The embodiment of the node 200 shown in FIG. 2 is for illustration only. Other embodiments of the node 200 could be used without departing from the scope of this disclosure. Also, for ease of explanation, the node 200 in FIG. 2 is described as operating in the industrial control and automation system 100 of FIG. 1. The node 200 could be used in any other capacity and in any suitable device, system, or network.

As shown in FIG. 2, the node 200 includes a wireless transceiver 202. The transceiver 202 facilitates wireless communications to and from the node 200. For example, the transceiver 202 could receive a baseband or intermediate data signal and modulate the signal onto a carrier signal for transmission by an antenna 204. The transceiver 202 could also receive a carrier signal from the antenna 204 and down-convert the signal into a baseband or intermediate signal. The transceiver 202 includes any suitable structure for transmitting and/or receiving wireless signals. In some embodiments, the transceiver 202 represents a radio frequency (RF) transceiver, and the antenna 204 represents an RF antenna. The transceiver 202 could use any other suitable wireless signals to communicate. Also, the transceiver 202 could be replaced by a transmitter and a separate receiver.

A controller 206 is coupled to the transceiver 202. The controller 206 controls the overall operation of the node 200. For example, the controller 206 may receive or generate data to be transmitted externally, and the controller 206 could provide the data to the transceiver 202 for wireless transmission. The controller 206 could also receive data from the transceiver 202 that was transmitted to the node 200 and use the data. As a particular example, the controller 206 in a leaf node 110a-110f could receive or generate sensor data associated with an industrial process and provide the data to the transceiver 202 for transmission to the controller 104 (via the gateway infrastructure node 112). The controller 206 in a leaf node 110a-110f could also receive data from the controller 104 and adjust operation of one or more actuators in the industrial control and automation system 100. The controller 206 in an infrastructure node 108a-108e can control the exchange of data messages between the leaf nodes 110a-110f and the gateway infrastructure node 112. The controller 206 in a gateway infrastructure node 112 can control the exchange of data messages between the infrastructure nodes 108a-108e and the network 106. The controller 206 includes any suitable hardware, software, firmware, or combination thereof for controlling operation of the node 200. As particular examples, the controller 206 could represent a processor, microprocessor, microcontroller, field programmable gate array (FPGA), or other processing or control device.

A memory 208 is coupled to the controller 206. The memory 208 stores any of a wide variety of information used, collected, or generated by the node 200. For example, the memory 208 could store sensor-related information when used in a leaf or infrastructure node within a wireless sensor network. As described in more detail below, the memory 208 could also store information used by the node 200 to determine an order in which infrastructure nodes 108a-108e transmit acknowledgement messages to a leaf node. The memory 208 could be used to store any other or additional information. The memory 208 includes any suitable volatile and/or non-volatile storage and retrieval device or devices.

If the node 200 represents an infrastructure node 108a-108e or a gateway infrastructure node 112, the node 200 can also include a backbone transceiver 210. The backbone transceiver 210 facilitates wireless communications between an infrastructure node and a gateway infrastructure node. For example, the backbone transceiver 210 in an infrastructure node 108a-108e could receive information from the gateway infrastructure node 112, allowing the infrastructure node to forward the information to a leaf node (via the transceiver 202). The backbone transceiver 210 in the infrastructure node 108a-108e could also receive information from a leaf node (via the transceiver 202) and communicate the information to the gateway infrastructure node 112. The backbone transceiver 210 in a gateway infrastructure node 112 could receive information from an infrastructure node 108a-108e, allowing the information to be forwarded over the network 106. The backbone transceiver 210 in the gateway infrastructure node 112 could also receive information sent over the network 106 and forward the information to the infrastructure nodes 108a-108e. The backbone transceiver 210 includes any suitable structure for transmitting and/or receiving wireless signals.

If the node 200 represents a gateway infrastructure node 112, the node 200 can further include a wired network interface 212. The wired network interface 212 allows the gateway infrastructure node 112 to communicate over a wired network, such as the network 106. This allows the gateway infrastructure node 112 to communicate over a wired network (such as the network 106) with other various components (such as the controller 104). The wired network interface 212 includes any suitable structure for transmitting and/or receiving signals over a wired network.

In addition, the node 200 includes a power supply or interface 214. If the node 200 represents an infrastructure node 108a-108e or a gateway infrastructure node 112, the power supply or interface 214 may represent a power converter, regulator, distributor, or other structure for receiving power from an external source and providing power to the components of the node 200. The power may be received from the external source in any suitable manner, such as over one or more wires or other physical connections. If the node 200 represents a leaf node 110a-110f, the power supply or interface 214 may represent an internal or locally connected power supply that provides power to the components of the node 200. In leaf nodes, the power supply or interface 214 could represent any suitable source of power, such as a battery, a solar cell, a fuel cell, or any other source of power.

Although FIG. 2 illustrates one example of a node 200 in an industrial control and automation system, various changes may be made to FIG. 2. For example, various components in FIG. 2 could be combined or omitted or additional components could be added according to particular needs. Also, the same or similar node 200 could be used in any suitable industrial control and automation system or environment or in any non-industrial control and automation system or environment (such as any system using an 802.11-based wireless network).

Figure 4:
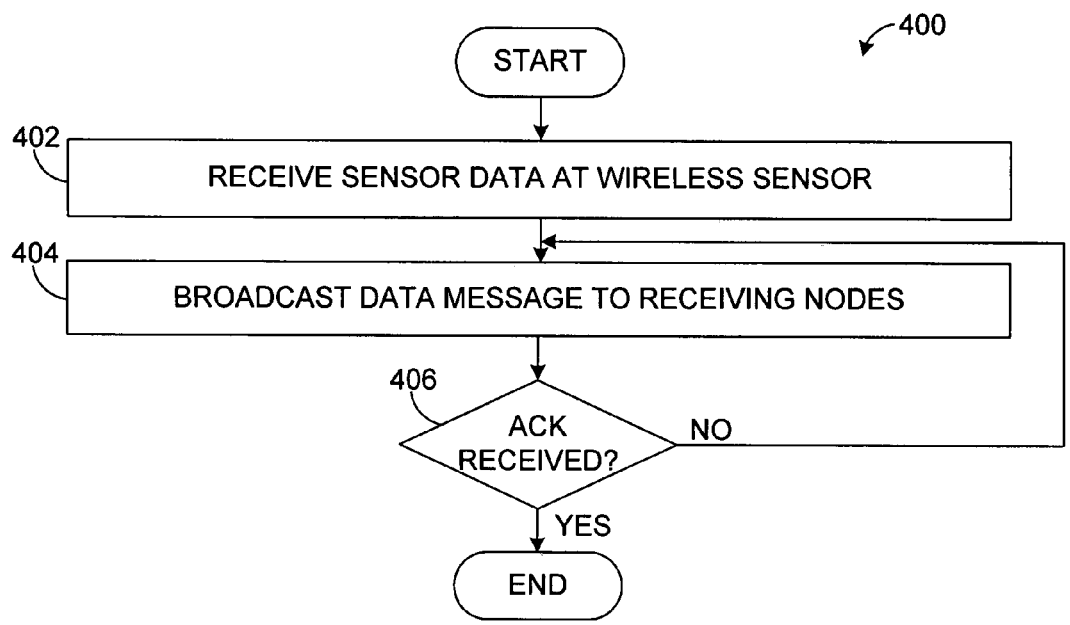
FIGS. 3 through 5 illustrate example methods for redundant communications from wireless devices in an industrial control and automation system according to one embodiment of this disclosure.
Figure 3:
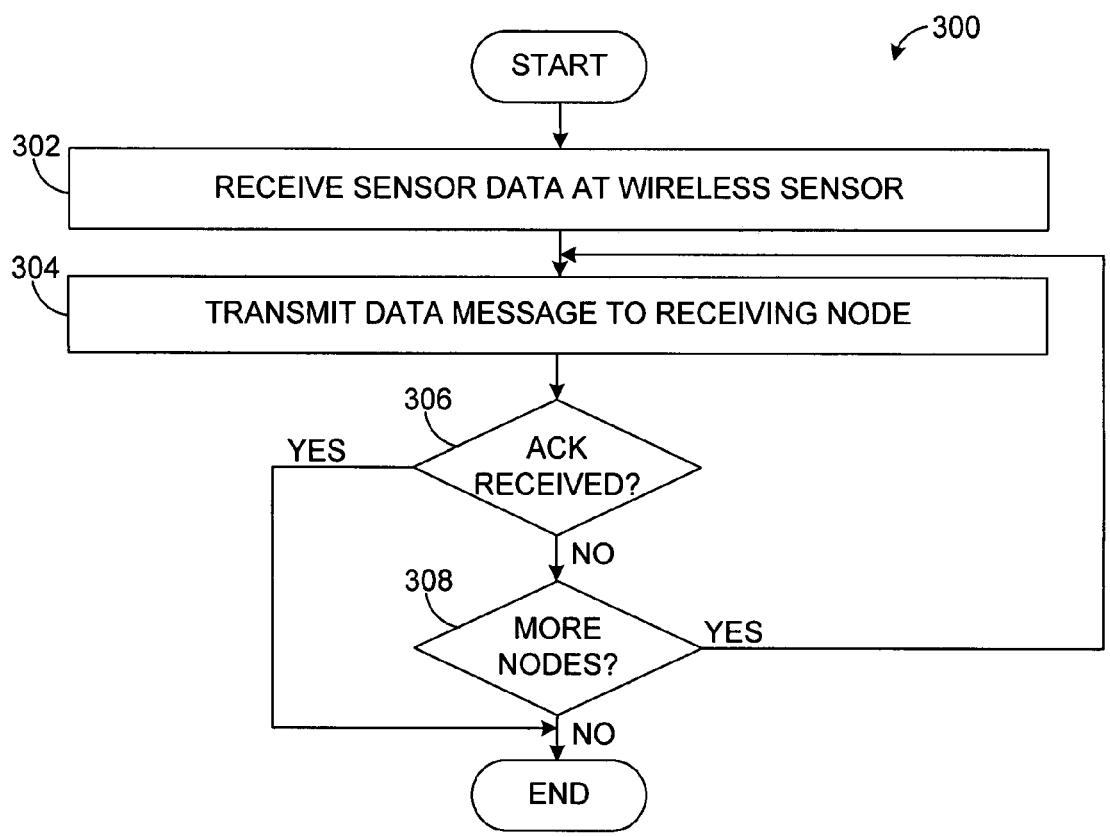
Figure 5:
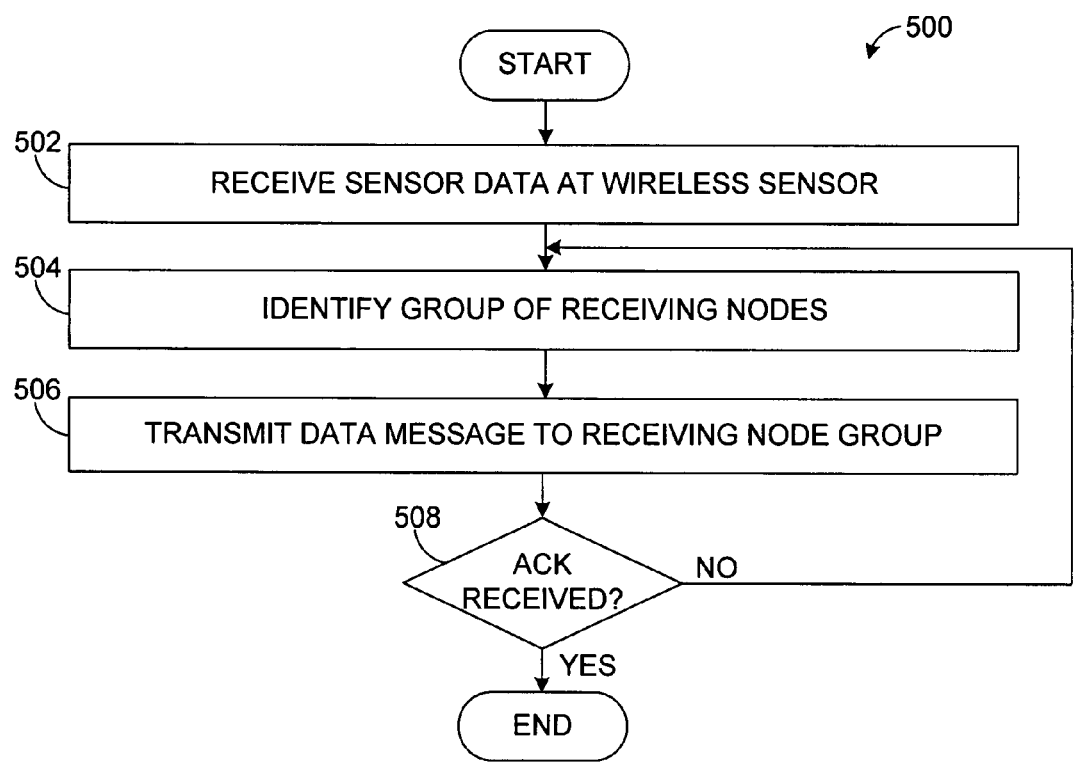

FIGS. 3 through 5 illustrate example methods for redundant communications from wireless devices in an industrial control and automation system according to one embodiment of this disclosure. The embodiments of the methods shown in FIGS. 3 through 5 are for illustration only. Other embodiments of the methods could be used without departing from the scope of this disclosure. Also, for ease of explanation, the methods are described with respect to redundant communications from a wireless sensor in the industrial control and automation system 100 of FIG. 1. The methods could be used with any other suitable device or system (whether or not the device or system is related to industrial control and automation).

In FIG. 3, a method 300 is used to send data from a wireless sensor (a leaf node) to multiple receiving nodes (infrastructure nodes), where multiple transmissions are made from the wireless sensor to the receiving nodes one at a time. As shown in FIG. 3, sensor data is received at a wireless sensor at step 302. This could include, for example, a leaf node receiving data from an external sensor. This could also include the leaf node generating or collecting the sensor data itself.

A data message is transmitted to a single receiving node at step 304. This could include, for example, the leaf node using data in its memory to identify multiple infrastructure nodes. This could also include the leaf node identifying one of the infrastructure nodes and transmitting a data message addressed to that selected infrastructure node.

If an acknowledgement message is received from that infrastructure node at step 306, the method 300 ends. At this point, the leaf node need not transmit any other messages to any other infrastructure nodes. Otherwise, the leaf node determines if there are one or more other receiving nodes that the leaf node can transmit the data message to at step 308. If so, the leaf node returns to step 304 to transmit the data message to another infrastructure node. Otherwise, the leaf node has attempted to communicate with all infrastructure nodes in its list without success, and the method 300 ends. In this case, the leaf node could perform any suitable action, such as generating an error or attempting to repeat the process and transmit the data to the infrastructure nodes in its list again.

While FIG. 3 shows that the leaf node determines whether an acknowledgement message is received between transmissions of the data message, this need not be the case. For example, the leaf node could transmit the data messages to the infrastructure nodes sequentially and then wait for an acknowledgement message. In this case, steps 306 and 308 could be switched in the method 300.

In FIG. 4, a method 400 is used to send data from a wireless sensor (a leaf node) to multiple receiving nodes (infrastructure nodes), where a single transmission is made from the wireless sensor to the receiving nodes. As shown in FIG. 4, sensor data is received at a wireless sensor at step 402. A data message is broadcast from the wireless sensor to multiple receiving nodes at step 404. This could include, for example, the leaf node broadcasting a data message for receipt by all infrastructure nodes within range of the wireless sensor. If an acknowledgement message is received by the leaf node from any of the infrastructure nodes at step 406, the method 400 ends. Otherwise, the leaf node returns to step 404 to rebroadcast the data message to the infrastructure nodes.

In FIG. 5, a method 500 is used to send data from a wireless sensor (a leaf node) to multiple receiving nodes (infrastructure nodes), where a single transmission is made from the wireless sensor to the receiving nodes. As shown in FIG. 5, sensor data is received at a wireless sensor at step 502. The wireless sensor identifies a group of receiving nodes to receive the sensor data at step 504. This could include, for example, the leaf node using data in its memory to identify a group identifier (such as a group number or group address) associated with multiple infrastructure nodes.

A data message is transmitted to the receiving nodes at step 506. This could include, for example, the leaf node broadcasting a data message containing the group identifier. If an acknowledgement message is received from any of the infrastructure nodes at step 508, the method 500 ends. Otherwise, the leaf node returns to step 504 to retransmit the data message to the infrastructure nodes.

Although FIGS. 3 through 5 illustrate examples of methods for redundant communications from wireless devices in an industrial control and automation system, various changes may be made to FIGS. 3 through 5. For example, while shown as a series of steps, various steps in each figure could overlap, occur in parallel, occur in a different order, or occur multiple times. Also, the same or similar methods could be used in any suitable industrial control and automation system or environment or in any non-industrial control and automation system or environment (such as any system using an 802.11-based wireless network).

Figure 6:
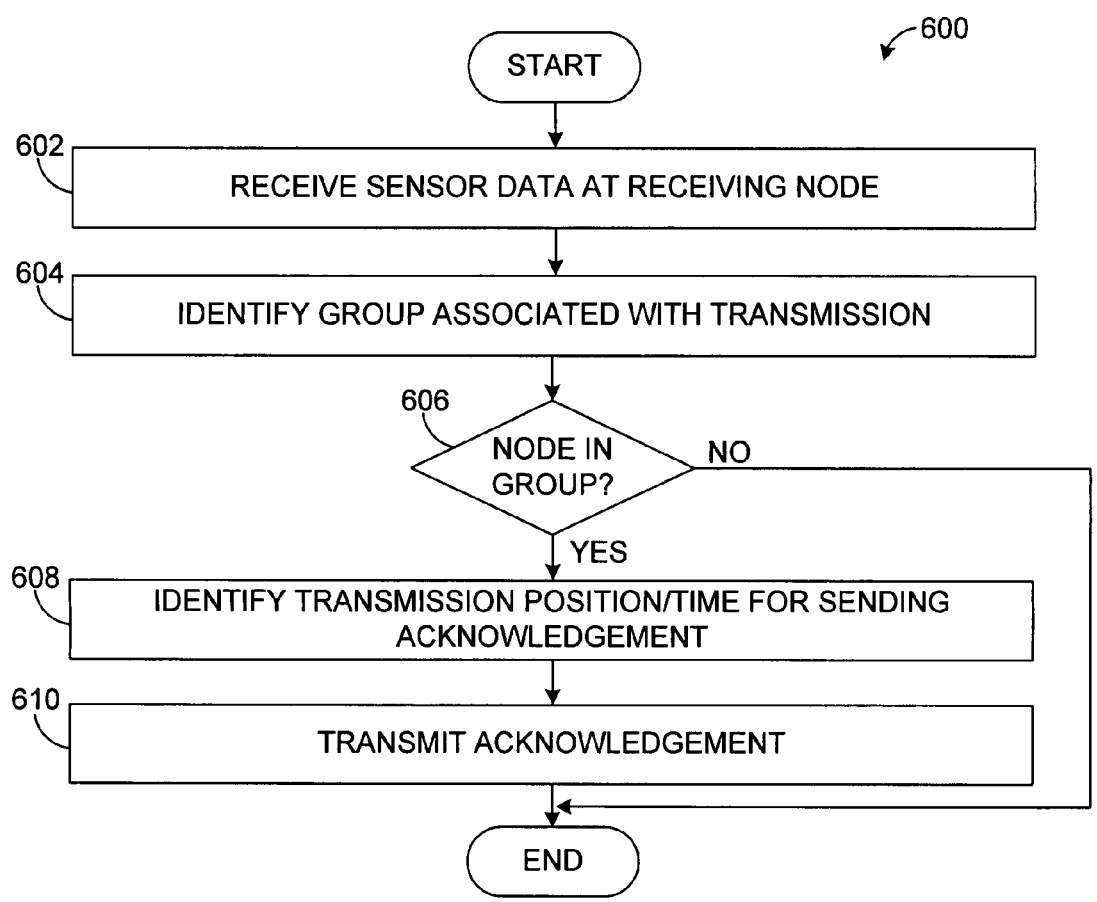
FIG. 6 illustrates an example method for acknowledging redundant communications from wireless devices in an industrial control and automation system according to one embodiment of this disclosure.

FIG. 6 illustrates an example method 600 for acknowledging redundant communications from wireless devices in an industrial control and automation system according to one embodiment of this disclosure. The embodiment of the method 600 shown in FIG. 6 is for illustration only. Other embodiments of the method 600 could be used without departing from the scope of this disclosure. Also, for ease of explanation, the method 600 is described with respect to redundant communications from a wireless sensor in the industrial control and automation system 100 of FIG. 1. The method 600 could be used with any other suitable device or system (whether or not the device or system is related to industrial control and automation).

A receiving node (such as an infrastructure node) receives sensor data from a wireless sensor at step 602. This could include, for example, the infrastructure node receiving a data message containing a group identifier and the sensor data from a leaf node. The receiving node identifies a group identifier associated with the received data message at step 604.

The receiving node determines whether it belongs to or is associated with the group identified by the group identifier at step 606. This could include, for example, the infrastructure node determining whether it is associated with a multi-cast group address. If not, the method 600 ends, and the infrastructure node need not take any other action related to the received sensor data.

Otherwise, the receiving node determines its position or time for sending an acknowledgement message to the wireless sensor at step 608. This may include, for example, the infrastructure node identifying its position or time for sending an acknowledgement message using the group identifier, which may identify both the infrastructure nodes in the group and their order of sending acknowledgements. The receiving node then sends an acknowledgement message to the wireless sensor at the appropriate position or time at step 610.

Although FIG. 6 illustrates one example of a method 600 for acknowledging redundant communications from wireless devices in an industrial control and automation system, various changes may be made to FIG. 6. For example, while shown as a series of steps, various steps in FIG. 6 could overlap, occur in parallel, occur in a different order, or occur multiple times. Also, the same or similar method could be used in any suitable industrial control and automation system or environment or in any non-industrial control and automation system or environment (such as any system using an 802.11-based wireless network).

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc or digital versatile disc (DVD), or any other type of medium.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. An apparatus comprising:
   a wireless transceiver configured to receive a message from a wireless device;
   a controller configured to identify a group identifier associated with the message; and
   a memory configured to store information identifying one or more intended recipients and an order of acknowledgement transmission associated with the group identifier;
   wherein the controller is further configured to determine whether the apparatus is one of the intended recipients associated with the group identifier and, if so, to identify a time or position to transmit an acknowledgement message to the wireless device; and
   wherein the wireless transceiver is further configured to transmit the acknowledgement message to the wireless device.

2. The apparatus of claim 1, wherein the group identifier comprises at least one of: a group number and a group address.

3. The apparatus of claim 1, wherein the group identifier comprises a multi-cast group address.

4. The apparatus of claim 1, wherein the wireless transceiver is compliant with an IEEE 802.11 wireless standard.

5. The apparatus of claim 1, wherein the apparatus is configured to operate in a Point Coordination Function mode of operation within a wireless network.

6. The apparatus of claim 1, wherein the controller is configured to determine the time to transmit the acknowledgement message to the wireless device based on the group identifier.

7. The apparatus of claim 1, wherein the controller is configured to determine the position to transmit the acknowledgement message to the wireless device based on the group identifier.

8. A method comprising:
   receiving a message from a wireless device at an access point;
   identifying a group identifier associated with the message, the group identifier associated with one or more intended recipients and an order of acknowledgement transmission;
   determining whether the access point is one of the intended recipients associated with the group identifier;
   identifying a time or position to transmit an acknowledgement message to the wireless device; and
   transmitting the acknowledgement message to the wireless device.

9. The method of claim 8, wherein the group identifier comprises at least one of: a group number and a group address.

10. The method of claim 8, wherein the group identifier comprises a multi-cast group address.

11. The method of claim 8, wherein the access point is compliant with an IEEE 802.11 wireless standard.

12. The method of claim 8, further comprising:
    operating the access point in a Point Coordination Function mode of operation within a wireless network.

13. The method of claim 8, wherein identifying the time or position to transmit the acknowledgement message comprises:
    determining the time to transmit the acknowledgement message to the wireless device based on the group identifier.

14. The method of claim 8, wherein identifying the time or position to transmit the acknowledgement message comprises:
    determining the position to transmit the acknowledgement message to the wireless device based on the group identifier.

15. The method of claim 8, wherein the wireless device comprises a wireless sensor or actuator in an industrial control and automation system.

16. A computer program product comprising a non-transitory computer readable storage medium embodying a computer program, the computer program comprising:
    computer readable program code for receiving a message from a wireless device at an access point;
    computer readable program code for identifying a group identifier associated with the message, the group identifier associated with one or more intended recipients and an order of acknowledgement transmission;
    computer readable program code for determining whether the access point is one of the intended recipients associated with the group identifier and for identifying a time or position to transmit an acknowledgement message to the wireless device; and
    computer readable program code for initiating transmission of the acknowledgement message to the wireless device.

17. The computer program product of claim 16, wherein the group identifier comprises a multi-cast group address.

18. The computer program product of claim 16, wherein the computer readable program code for identifying the time or position to transmit the acknowledgement message comprises:
    computer readable program code for determining the time to transmit the acknowledgement message to the wireless device based on the group identifier.

19. The computer program product of claim 16, wherein the computer readable program code for identifying the time or position to transmit the acknowledgement message comprises:
    computer readable program code for determining the position to transmit the acknowledgement message to the wireless device based on the group identifier.

20. The computer program product of claim 16, wherein the computer readable program code for receiving the message comprises computer readable program code for receiving a message compliant with an IEEE 802.11 wireless standard.

* * * * *